United States Patent [19]

Harris

[11] 4,131,826

[45] Dec. 26, 1978

[54] TRIGGERING CIRCUIT FOR TRIGGERED VACUUM GAPS

[75] Inventor: Lawson P. Harris, Scotia, N.Y.

[73] Assignee: General Electric Company, Schenectady, N.Y.

[21] Appl. No.: 821,555

[22] Filed: Aug. 3, 1977

[51] Int. Cl.² .......................................... H02M 1/02
[52] U.S. Cl. ................................ 315/234; 315/235; 315/263; 315/264; 315/335; 361/16
[58] Field of Search ............... 315/234, 235, 261, 263, 315/264, 330, 335; 361/15, 16

[56] References Cited

U.S. PATENT DOCUMENTS

| | | | |
|---|---|---|---|
| 2,955,233 | 10/1960 | Paley et al. | 315/263 X |
| 3,311,784 | 3/1967 | Casanova | 315/263 X |
| 3,319,121 | 5/1967 | Lee | 361/16 |
| 3,514,636 | 5/1970 | Farrall | 315/199 X |

OTHER PUBLICATIONS

Terman, *Electronic and Radio Engineering,* 4th Ed., McGraw-Hill, 1955, pp. 644–647.
Durling, *An Introduction to Electrical Engineering,* MacMillan, 1969, pp. 374–376.

*Primary Examiner*—Eugene R. La Roche
*Attorney, Agent, or Firm*—Nathan D. Herkamp; Joseph T. Cohen; Leo I. MaLossi

[57] ABSTRACT

An RLC triggering circuit employs an inductance coupled to the trigger electrode of a triggered vacuum gap device. A capacitance and a switch are coupled in series with the inductance. A diode in parallel with the series-coupled capacitance and switch serves to provide a long, unidirectional current pulse to prevent the triggered vacuum gap from chopping current and generating dangerous surge voltages.

5 Claims, 5 Drawing Figures

TRIGGERING CIRCUIT FOR TRIGGERED VACUUM GAPS

INTRODUCTION

This invention relates to circuits for triggering power switching vacuum gap devices, and more particularly to a circuit for reliably triggering such devices in a manner which precludes chopping of current and thereby avoids generation of dangerous surge voltages.

Power switching vacuum gap devices such as described in J. M. Lafferty U.S. Pat. No. 3,087,092, issued Apr. 23, 1963, have been successfully applied to precise switching of large voltages and currents. These devices generally comprise, in one embodiment, a cathode electrode and an anode electrode spaced apart from each other in a vacuum environment within an evacuated envelope. The cathode and anode electrodes are fabricated of gas-free metal. A trigger electrode is positioned closely adjacent at least one of the cathode and anode electrodes to establish within the gap between these electrodes a sufficient quantity of charge carriers to cause electrical breakdown of the gap.

As described in the aforementioned Lafferty patent, the trigger electrode comprises a metallic member charged with an ionizable gas. Application of a trigger voltage across the gap between the trigger electrode and the electrode closely adjacent thereto initiates an electrical arc discharge across this gap, heating the trigger electrode which consequently evolves the ionizable gas into the primary gap. In this fashion, conductivity of the primary gap is abruptly increased. Other types of trigger electrodes may alternatively be employed.

As ever larger triggered vacuum gap devices are employed, for example in series capacitor protection equipment for high voltage transmission lines, reliable triggering of these devices concomitantly becomes an increasingly greater problem. Although for smaller triggered vacuum gap devices (i.e., those with a discharge volume up to about two liters) a simple series-connected RC triggering circuit is usually adequate, larger triggered vacuum gap devices require that the high energy dissipated in the resistance must be accommodated. To overcome this limitation, series RLC trigger circuits have been employed.

For still larger triggered vacuum gap devices (i.e., those having discharge volumes exceeding 4-5 liters), however, the energy storage capacitor in the series RLC circuit becomes increasingly bulky and expensive. It would be desirable to reduce the bulk and expense of the energy storage capacitor without significantly adding to the bulk or expense of the remainder of the circuit and without adding undue circuit complexity. The present invention facilitates achievement of these results.

Accordingly, one object of the invention is to provide a triggering circuit for triggered vacuum gap devices which produces a long unidirectional current pulse and thereby eliminates periodic current zeros.

Another object is to provide a circuit for triggering triggered vacuum gap devices without contributing any tendency for the triggered vacuum gap device to chop current and generate dangerous surge voltages.

Another object is to provide a simple RLC circuit for triggering large triggered vacuum gap devices without requiring exorbitant capacitive energy storage and without need for excessively large inductance in the circuit.

Briefly, in accordance with a preferred embodiment of the invention, circuit means are provided for controlling conduction of a vacuum gap device having a trigger electrode and having a pair of primary gap electrodes energized by a power source. The circuit means energizes the trigger electrode at a predetermined, controllable time, and comprises series-coupled capacitive energy storage means and switching means. Unidirectional conducting means are coupled in parallel with the series-coupled capacitive energy storage means and switching means, and inductance means are provided for coupling the switching means to the trigger electrode.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
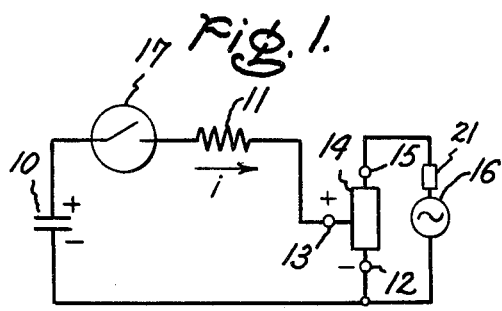
FIG. 1 is a schematic diagram of a simple RC triggering circuit, useful for triggering triggered vacuum gap devices having a discharge volume of up to about two liters.

In FIG. 1, an energy storage capacitor 10 is connected through a switch 17 in series with a resistance 11 across the cathode and trigger electrodes 12 and 13, respectively, of triggered vacuum gap device 14. Switch 17 may typically comprise a silicon controlled rectifier or a triggered spark gap. A power or current source 16 is connected in series with a mainly resistive or inductive load 21 across cathode and anode electrodes 12 and 15, respectively, of triggered vacuum gap device 14. Conductivity of triggered vacuum gap device 14, measured across electrodes 12 and 15, is essentially zero at all times except for periods between trigger electrode firings and subsequent power current zeros.

Figure 2:
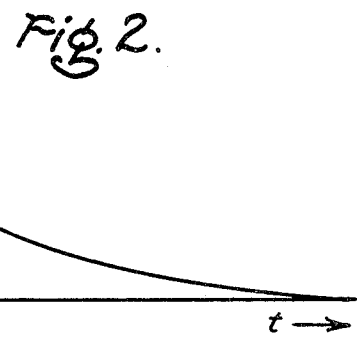
FIG. 2 is a graphical illustration of current flow to a triggered vacuum gap device as supplied by the circuit of FIG. 1.

In operation, closing of switch 17 causes capacitor 10, which has been charged to a predetermined voltage by circuitry not shown, to supply discharge current to trigger electrode 13 of triggered vacuum gap device 14. This trigger current begins at a maximum value $i_{max}$ equal to the fully charged voltage $V_O$ on capacitor 10 divided by the ohmic value R of resistance 11. The trigger-to-cathode resistance of the triggered vacuum gap device is essentially negligible in comparison to R when the triggered vacuum gap device fires. The instantaneous current flow i through the trigger electrode of the triggered vacuum gap device, upon firing, may be expressed as:

$$i = i_{max}\epsilon^{-\frac{t}{RC}} - \frac{V_{trig}}{R}\left(1 - \epsilon^{-\frac{t}{RC}}\right)$$

where $V_{trig}$ is the trigger-to-cathode arc voltage during the triggering operation (and assumed constant here), C is the capacitance of capacitor 10, t is time and $\epsilon$ is the base of the system of natural logarithms. As shown in FIG. 2, trigger current through the circuit of FIG. 1 decreases from $i_{max}$ at the instant the triggered vacuum gap fires, to zero at some subsequent time. At some instant prior to reaching zero, current flow through the trigger falls below a minimum value required to sustain firing of the triggered vacuum gap device, causing cessation of anode-to-cathode current flow through the device.

Figure 3:
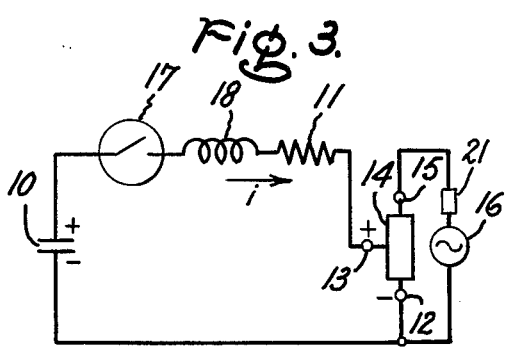
FIG. 3 is a schematic diagram of an RLC triggering circuit, useful for triggering triggered vacuum gap devices having a discharge volume of about 2 to 4 or 5 liters.
Figure 4:
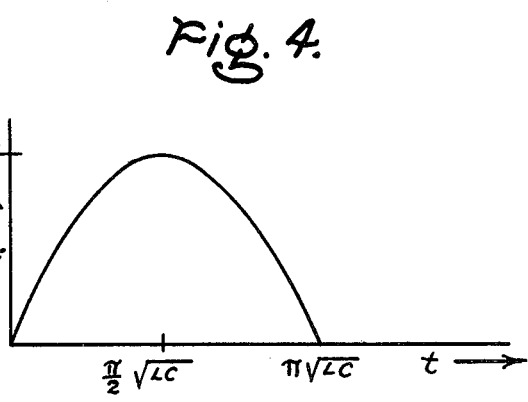
FIG. 4 is a graphical illustration of current flow to a trigger vacuum gap device as supplied by the circuit of FIG. 3.

In FIG. 3, the circuit for firing larger triggered vacuum gap devices employs an inductance 18 in series with capacitance 10, switch 17 and resistance 11, in order to limit the peak current and the amount of energy dissipated in resistance 11. Addition of inductance 18 results in trigger current of the form graphically illustrated in FIG. 4, where trigger current begins at zero amplitude, reaches a maximum value of approximately $V_0\sqrt{C/L}$ at time $\pi/2\sqrt{LC}$, where L is the value of inductance 18, and again falls off to zero at time $\pi\sqrt{LC}$. The trigger current in this instance may be expressed as $$i_{max} \sin \frac{t}{\sqrt{LC}}.$$

For triggered vacuum gap devices having discharge volumes larger than four or five liters, the required energy storage capacitor becomes increasingly bulky and expensive. The circuitry of FIG. 5 overcomes this problem without requiring additional capacitors or inductors and without the periodic zero values of trigger current that can cause the triggered vacuum gap device to chop current (i.e., switch to a nonconductive condition while conducting anode-to-cathode current) and thereby generate large surge voltages which would be dangerous to voltage sensitive equipment. In this circuit, the apparatus of FIG. 3 is modified by coupling a unidirectional conducting device, such as a diode 20, in parallel with series-connected capacitance 10 and switch 17 (here shown as a silicon controlled rectifier).

Figure 5:
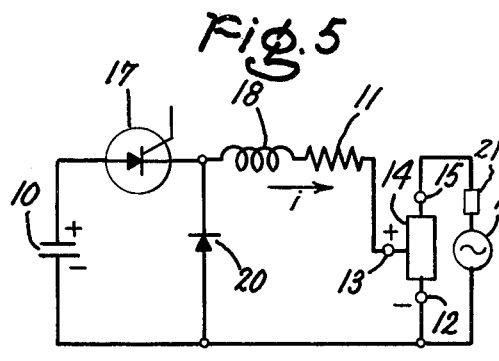
FIG. 5 is a schematic diagram of the triggering circuit of the present invention, useful for triggering triggered vacuum gap devices having a discharge volume exceeding about 4 or 5 liters.

If an ideal zero resistance inductor 18 could be used in the circuit of FIG. 5, resistance 11 could be entirely eliminated, and the circuit would provide a current pulse that decays approximately linearly with time after current peak in accordance with the equation $$\frac{di}{dt} = -\frac{V_{trig}}{L}.$$

Then if the maximum current $i_{max}$ and minimum time $\tau$ for 50% decay are specified, capacitive energy storage $(CV_o^2/2)$ and the size of inductance L, respectively, are given by $$\frac{CV_o^2}{2} = \frac{Li^2_{max}}{2} \text{ and}$$

$$L = \frac{2\tau V_{trig}}{i_{max}}$$

This design procedure usually leads to small inductors for which practical construction furnishes L/R decay times shorter than the desired trigger current pulse length. Current decay is then controlled not by the trigger voltage but by dissipation in inductance 18 according to the equation $$\frac{di}{dt} = -\frac{R}{L}i$$

In this instance, if the maximum current $i_{max}$ and the minimum time $\tau$ for 50% decay are specified, the value L of inductance 18 is determined as the smallest value for which $$L \geq R\tau/(\ln 2)$$

where ln indicates the natural logarithm. The capacitive energy storage is determined as before.

Thus the rational design of the circuit shown in FIG. 5 leads naturally to the smallest inductance 18 consistent with the required trigger current pulse and with economical coil manufacturing technology. This circuit provides a practical minimum in peak inductive energy storage ($Li^2_{max}/2$) and, therefore, in required capacitive energy storage.

Figure 6:
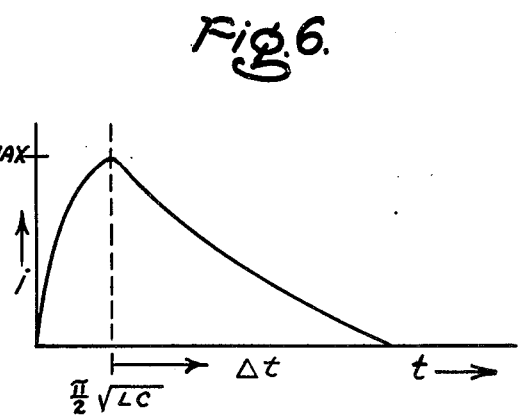
FIG. 6 is a graphical illustration of current flow to a triggered vacuum gap device as supplied by the circuit of FIG. 5.

The trigger current produced by the circuit of FIG. 5 is illustrated graphically in FIG. 6, where the current reaches a maximum at time $\pi/2\sqrt{LC}$, the maximum current $i_{max}$ being approximately $V_0\sqrt{C/L}$. Since diode 20 is polarized to be nonconductive during the initial portion of the discharge from capacitor 10, the rise in trigger current amplitude is essentially identical to that of the circuit of FIG. 3. During any increment of time $\Delta t$ after occurrence of $i_{max}$, when diode 20 becomes conductive due to voltage induced thereacross by inductor 18, trigger current decays from its maximum as voltage on capacitor 10 decreases and current induced by inductance 18 diminishes, in a manner that may be expressed as $$i_{max}\epsilon^{-\frac{R\Delta t}{L}} - \frac{V_{trig}}{R}\left(1 - \epsilon^{-\frac{R\Delta t}{L}}\right).$$

Consequently, a practical, economical and simple circuit may be connected for firing a triggered vacuum gap device safely.

The foregoing describes a triggering circuit for triggered vacuum gap devices which produces a long unidirectional current pulse and thereby eliminates periodic current zeros. The circuit triggers triggered vacuum gap devices without contributing any tendency for the triggered vacuum gap device to chop current and generate dangerous surge voltages. A simple RLC circuit is thus provided for triggering large triggered vacuum gap devices without requiring exorbitant capacitive energy storage and without need for excessively large inductance in the circuit.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. Circuit means for controlling conduction of a vacuum gap device having a trigger electrode and having a pair of primary gap electrodes energized by a power source, said circuit means energizing said trigger electrode at a predetermined, controllable time, and comprising:

capacitive energy storage means;

switching means coupled in series with said capacitive energy storage means;

unidirectional conducting means coupled in parallel with the series-coupled capacitive energy storage means and switching means; and inductance means coupling said switching means to said trigger electrode.

2. The apparatus of claim 1 wherein said inductance means includes resistance in series therewith.

3. The apparatus of claim 1 wherein said unidirectional conducting means includes a diode having its cathode electrode connected to said inductance means.

4. The apparatus of claim 1 wherein said switching means comprises a silicon controlled rectifier.

5. The apparatus of claim 3 wherein said capacitive energy storage means and the anode electrode of said diode are connected to one of said primary gap electrodes.

* * * * *